US011915312B2

(12) United States Patent
Long et al.

(10) Patent No.: US 11,915,312 B2
(45) Date of Patent: Feb. 27, 2024

(54) SYSTEMS AND METHODS FOR PROCESSING PEER-TO-PEER FINANCIAL PRODUCT MARKUP LANGUAGE AGENCY NOTICES

(71) Applicant: JPMORGAN CHASE BANK, N.A., New York, NY (US)

(72) Inventors: James M. Long, Jersey City, NJ (US); Donald Conte, Hillsdale, NJ (US); Satish V. Kattumuri, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 228 days.

(21) Appl. No.: 17/202,222

(22) Filed: Mar. 15, 2021

(65) Prior Publication Data
US 2021/0201406 A1    Jul. 1, 2021

Related U.S. Application Data

(62) Division of application No. 16/130,214, filed on Sep. 13, 2018, now abandoned.

(Continued)

(51) Int. Cl.
*G06Q 40/03* (2023.01)
*G06Q 20/22* (2012.01)
(Continued)

(52) U.S. Cl.
CPC ........... *G06Q 40/03* (2023.01); *G06F 40/143* (2020.01); *G06Q 20/223* (2013.01);
(Continued)

(58) Field of Classification Search
CPC .............. G06Q 40/00–128; G06Q 20/00–425
See application file for complete search history.

(56) References Cited

U.S. PATENT DOCUMENTS 8,185,606 B2 * 5/2012 Sampang ............. G06Q 10/107
                                                    709/217
9,965,791 B1 * 5/2018 Baxter ................. G06Q 10/083
(Continued)

OTHER PUBLICATIONS

Nentwich, C. ('Validating FpML'), Handbook on system risk published by Proceedings by deepX Ltd, 2013 (Year: 2013).*
(Continued)

*Primary Examiner* — John W Hayes
*Assistant Examiner* — Chenyuh Kuo
(74) *Attorney, Agent, or Firm* — GREENBERG TRAURIG LLP

(57) ABSTRACT

Systems and methods for processing peer-to-peer financial product markup language agency notices are disclosed. According to one embodiment, in an information processing apparatus, a computer-implemented method for processing peer-to-peer financial product markup language agency notices may include: (1) receiving a FpML notice from a sender to a receiver; (2) obtaining a sender unique identifier for the sender and a receiver unique identifier for the receiver; (3) generating a FpML message body for a transaction associated with the notice; (4) generating FpML data comprising the unique identifiers and the FpML message body; (5) generating an electronic message comprising the FpML data; and (6) sending the electronic message FpML data to the receiver.

12 Claims, 4 Drawing Sheets

Related U.S. Application Data

(60) Provisional application No. 62/557,910, filed on Sep. 13, 2017.

(51) Int. Cl.
  *H04L 9/14* (2006.01)
  *H04L 9/40* (2022.01)
  *H04L 9/08* (2006.01)
  *G06F 40/143* (2020.01)
  *G06F 40/117* (2020.01)
  *G06F 40/174* (2020.01)
  *G06F 40/205* (2020.01)

(52) U.S. Cl.
  CPC .............. *H04L 9/0825* (2013.01); *H04L 9/14* (2013.01); *H04L 63/0428* (2013.01); *G06F 40/117* (2020.01); *G06F 40/174* (2020.01); *G06F 40/205* (2020.01); *H04L 2209/56* (2013.01); *H04L 2463/062* (2013.01)

(56) References Cited

U.S. PATENT DOCUMENTS

| | | | |
|---|---|---|---|
| 10,038,675 B2* | 7/2018 | Baudoin | H04L 63/0435 |
| 2006/0294377 A1* | 12/2006 | Ho | H04L 63/0435 |
| | | | 713/170 |
| 2009/0064175 A1* | 3/2009 | Taylor | G06Q 10/10 |
| | | | 719/313 |
| 2018/0322571 A1* | 11/2018 | Vea | G06Q 30/02 |

OTHER PUBLICATIONS

FpML 2.0 Recommendation (FpML Financial Products Markup Language Version 2.0 Recommendation May 5, 2003 , pp. 8-14 ( Year: 2003).*

Jacobs et al., Applying FpML (Chapter 3)-Handbook on Systemic Risk, published by Cambridge University, 2013, ISBN-978-1-108-023434-7, pp. 66, 72-74 (Year: 2013).*

* cited by examiner

SYSTEMS AND METHODS FOR PROCESSING PEER-TO-PEER FINANCIAL PRODUCT MARKUP LANGUAGE AGENCY NOTICES

RELATED APPLICATION

The present application is a Divisional of U.S. patent application Ser. No. 16/130,214, filed Sep. 13, 2018, which claims priority to U.S. Provisional Patent Application Ser. No. 62/557,910, filed Sep. 13, 2017, the disclosures of each are hereby incorporated by reference in its entirety.

BACKGROUND OF THE INVENTION

1. Field of the Invention

The present invention generally relates to systems and methods for processing peer-to-peer financial product markup language agency notices.

2. Description of the Related Art

The use of Financial Product Markup Language, or FpML, is known. The benefits include reducing operation costs, as well as improved accuracy. Despite these benefits, industry adoption has been slow for several reasons, including an end-to-end solution that requires custom developed middleware, difficulty in coordinated testing with counterparties, multiple operation processes to cover FpML and legacy notices independently, limitations in FpML coverage, reliance on vendor hub and software, difficulty in incremental rollout, and the need for additional business processes around exceptions and non-FpML notices.

SUMMARY OF THE INVENTION

Systems and methods for processing peer-to-peer financial product markup language agency notices are disclosed. According to one embodiment, in an information processing apparatus, a computer-implemented method for processing peer-to-peer financial product markup language agency notices may include: (1) receiving a FpML notice from a sender to a receiver; (2) obtaining a sender unique identifier for the sender and a receiver unique identifier for the receiver; (3) generating a FpML message body for a transaction associated with the notice; (4) generating FpML data comprising the unique identifiers and the FpML message body; (5) generating an electronic message comprising the FpML data; and (6) sending the electronic message FpML data to the receiver.

In one embodiment, the method may further include encrypting the FpML message body with a first encryption key.

In one embodiment, the method may further include encrypting the first encryption key using a second encryption key. The FpML data may also include the encrypted first encryption key.

In one embodiment, the first encryption key may include an AES encryption key.

In one embodiment, the second encryption key may include an RSA encryption key associated with the receiver.

In one embodiment, the method may further include encrypting the unique identifiers with a third encryption key prior to generating the FpML data.

In one embodiment, the third encryption key may include an RSA encryption key associated with the sender.

In one embodiment, the FpML data may be embedded between a plurality of tags in the body of the electronic message.

According to another embodiment, in an information processing apparatus comprising at least one computer processor, a computer-implemented method for peer-to-peer financial product markup language agency notices may include: (1) receiving an electronic message from a sender to a receiver; (2) determining that the electronic message comprises FpML data; (3) extracting the FpML data from the message; (4) parsing, from the FpML data, a sender's unique identifier, a receiver's unique identifier, and a FpML message body; and (5) populating fields in a transaction on a loan servicing system with data from the FpML message.

In one embodiment, the FpML message may be encrypted with a first encryption key, and the method may further include decrypting the encrypted FpML message with the first encryption key.

In one embodiment, the FpML message may further include the first encryption key that is encrypted with a second encryption key, and the method may further include decrypting the first encryption key with a third encryption key.

In one embodiment, the first encryption key may include an AES encryption key.

In one embodiment, the second encryption key may include an RSA encryption key associated with the receiver.

In one embodiment, the market identifiers may be encrypted with a third encryption key, and the method may further include decrypting the unique identifiers with a fourth encryption key. The fourth encryption key may include an RSA encryption key associated with the sender.

In one embodiment, the FpML message may be embedded between a plurality of tags in the message body.

According to another embodiment, a system for peer-to-peer financial product markup language agency notices may include a sender information processing apparatus comprising at least one computer processor, and a receiver information processing apparatus comprising at least one computer processor in communication with the receiver information processing apparatus. The sender information processing apparatus may receive a FpML notice from a sender to a receiver; obtain a sender unique identifier for the sender and a receiver unique identifier for the receiver; generate a FpML message body for a transaction associated with the notice; generate FpML data comprising the unique identifiers and the FpML message body; generate an electronic message comprising the FpML data; and send the electronic message to the receiver information processing apparatus. The receiver information processing apparatus may: receive the electronic message from the sender information processing apparatus; determine that the electronic message comprises FpML data; extract the FpML data from the electronic message; parse, from the FpML data, a sender's unique identifier, a receiver's unique identifier, and a FpML message body; and populate fields in a transaction on a loan servicing system with data from the FpML message.

In one embodiment, the sender information processing apparatus may further encrypt the FpML message body with a first encryption key. The receiver information processing apparatus may further decrypt the FpML message body with the first encryption key.

In one embodiment, the sender information processing apparatus may further encrypt the first encryption key using a second encryption key, and the FpML data further comprises the encrypted first encryption key. The receiver information processing apparatus may further decrypt the first encryption key with a third encryption key.

In one embodiment, the FpML message is embedded between a plurality of tags in the message body.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments of the invention.

DETAILED DESCRIPTION OF THE PREFERRED EMBODIMENTS

Figure 1:
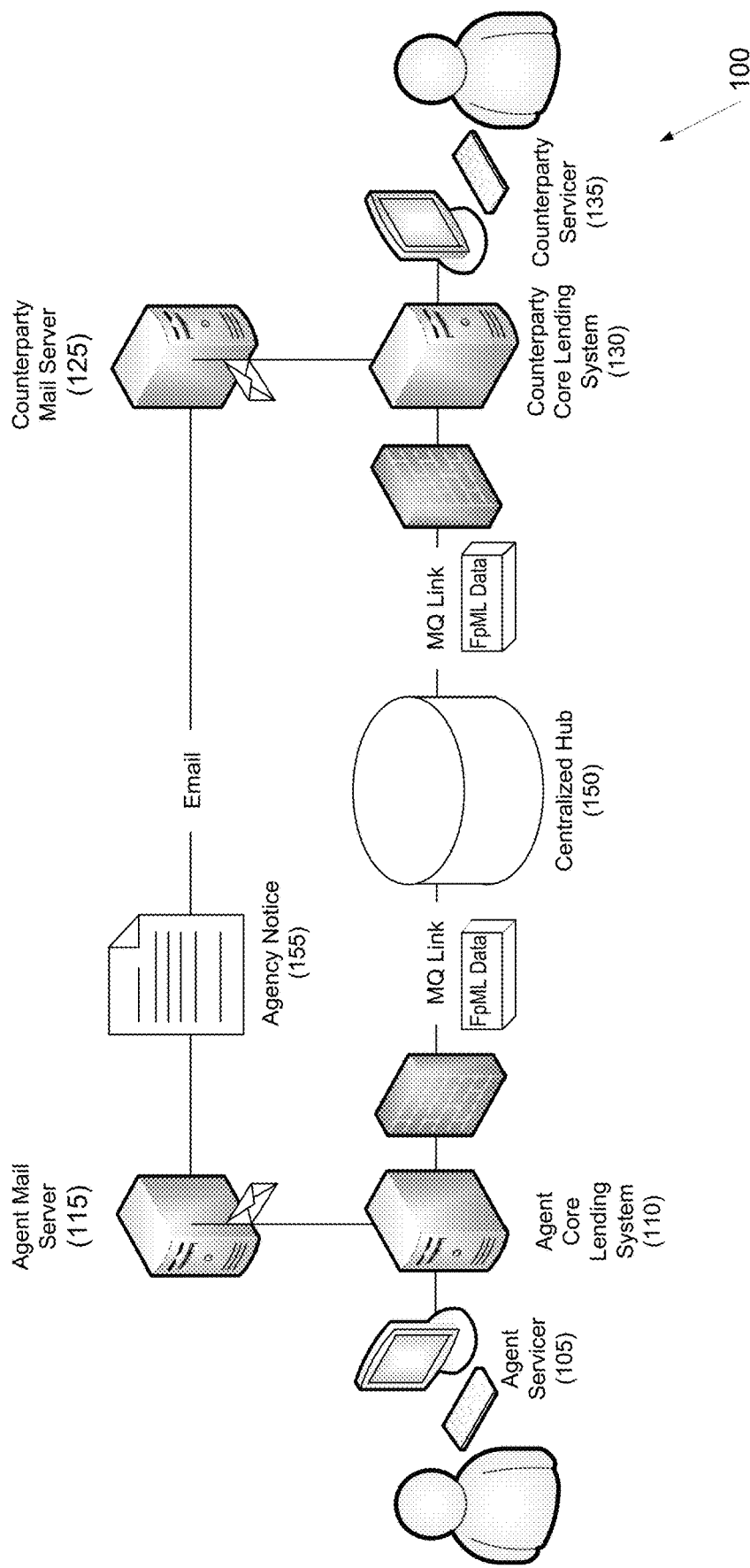
FIG. 1 is an illustration of a known process of using FpML notices.

Referring to FIG. 1, an illustration of a known process 100 of using FpML notices is disclosed. In one embodiment, human readable agency notices 155 are sent from agent servicer 105 to counterparty servicer 135 via email. These notices describe transaction activity. Machine-readable FpML data is sent to centralized hub 150, and centralized hub 150 then routes this data to counterparty servicer 135. Both parties 105, 135 need to coordinate with centralized hub 150, which incurs fees and works to establish and maintain this link. Both parties 105, 135 also need two processes in place to handle FpML data and notices independently.

Figure 2:
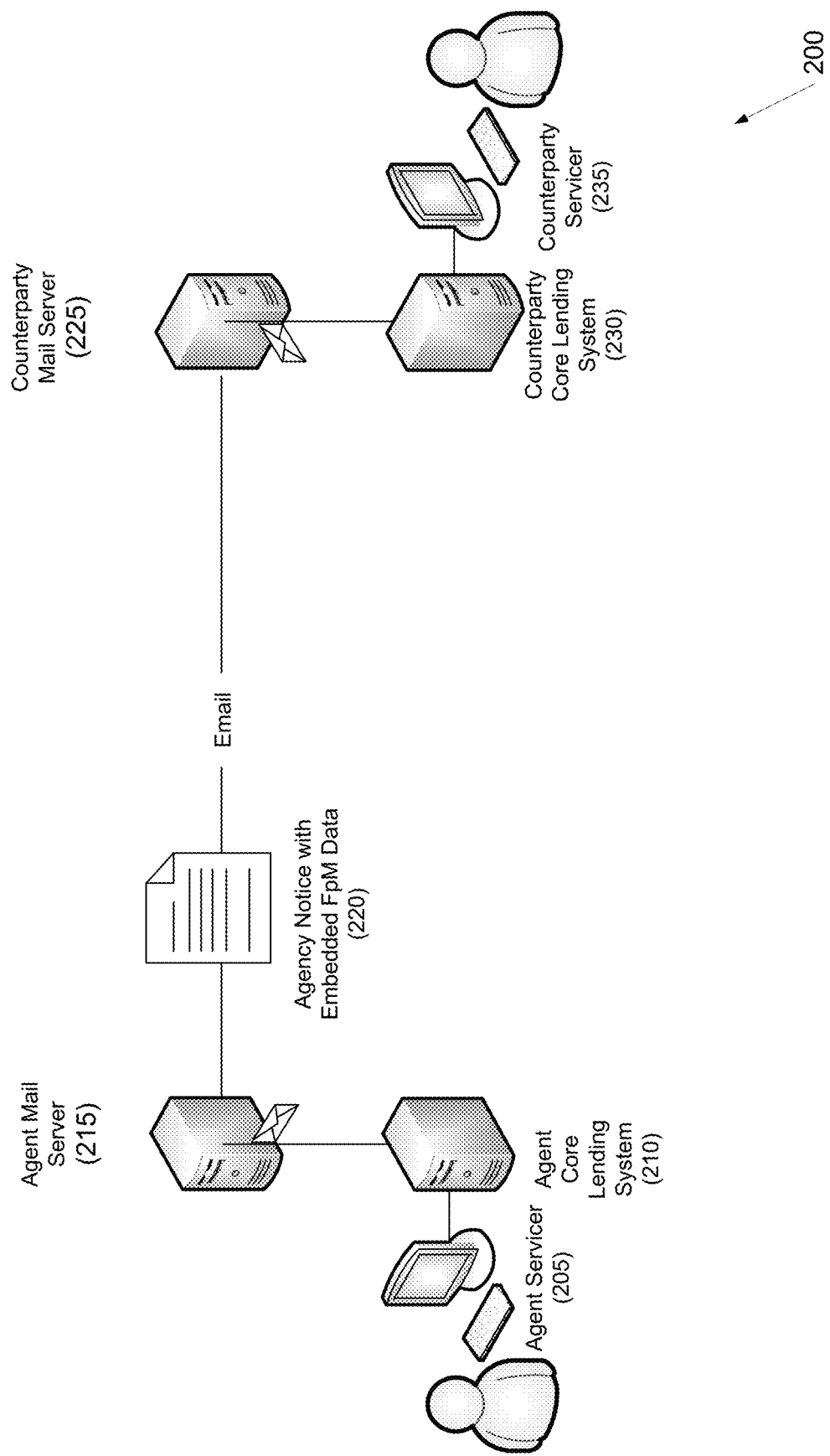
FIG. 2 is a diagram of an exemplary system and method for peer-to-peer FpML agency notices according to one embodiment.

Referring to FIG. 2, a system and method for peer-to-peer financial product markup language agency notices is disclosed according to one embodiment. System 200 may include agent 205, agent core lending system 210, agent mail server 215, counterparty mail server 225, counterparty core lending system 230, and counterparty servicer 235. Agent 205 may send human readable agency notices to counterparty servicer 235 via a message, such as email. Agent 205 may embed the FpML data within the notice 220 by encoding it within the body of the email. Thus, the centralized hub of FIG. 1 is no longer needed; a single process can exist for both notice and FpML.

Figure 3:
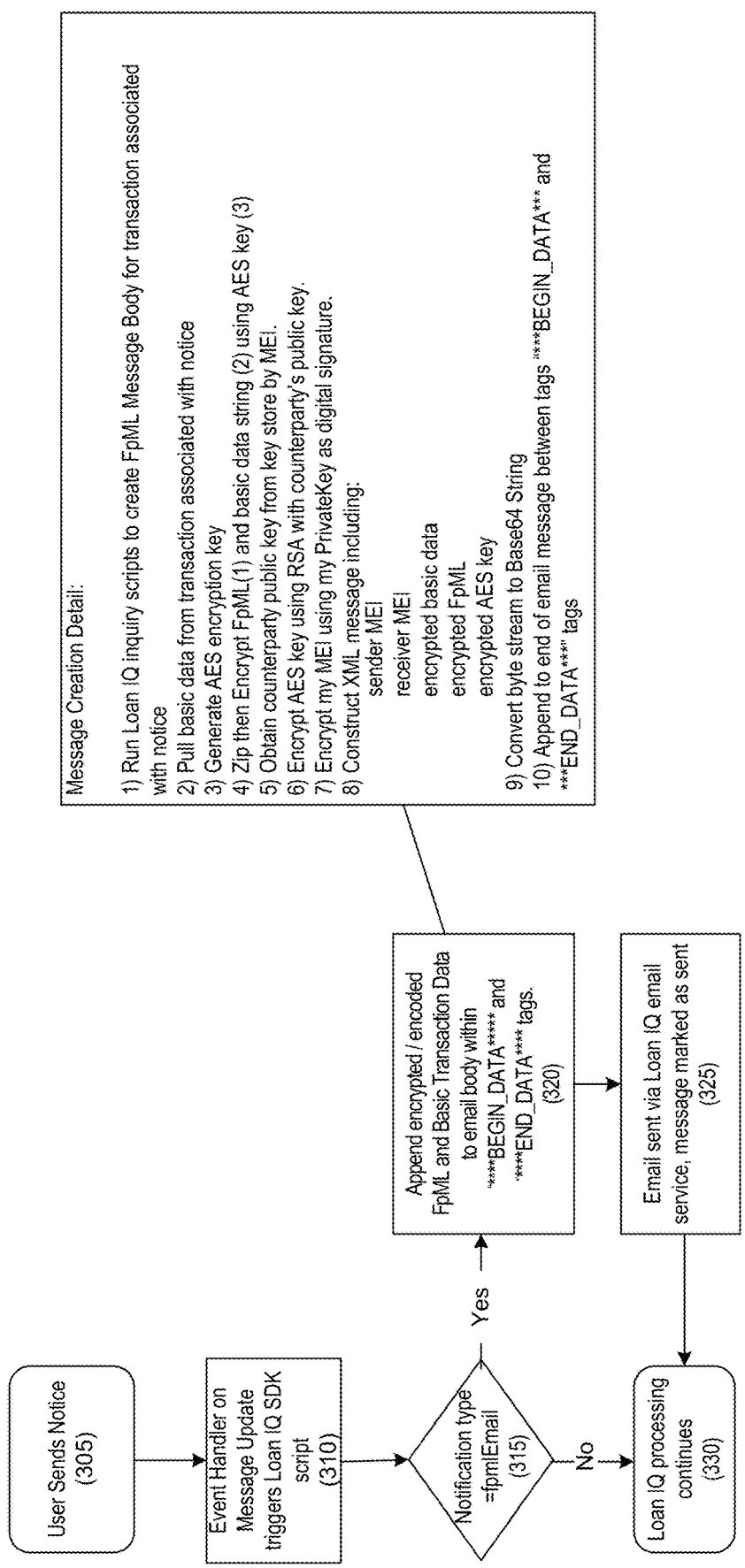
FIG. 3 is a diagram illustrating a method for creating an outbound message according to one embodiment.

Referring to FIG. 3, an exemplary process for the creation of an outbound message is disclosed according to one embodiment. In step 305, an agent may generate a notice to send to a lender. In step 310, an event handler may intercept the message send and may cause a loan servicing system's or core lending system's SDK script to execute. An example loan servicing system is Loan IQ; other loan services may be used as is necessary and/or desired.

In step 315, if the script determines that the notification type is a fpmlEmail, then in step 320, the script appends encrypted/encoded FpML and basic transaction data to the email body within tags, such as "**BEGIN_DATA" and "END_DATA**". A loan servicing system may have an option to set a flag for the notification type, for example to set the notice type as an "FpML email."

Exemplary message creation details are provided in the inset in FIG. 3. Referring to the inset in FIG. 3, the message may include, for example, a sender unique identifier, a receiver unique identifier, encrypted basic data from a transaction associated with the notice, encrypted FpML data, and an encrypted encryption key. The sender and receiver unique identifiers may be, for example, market entity identifiers (MEIs) or any other suitable unique identifiers. The encryption key may be, for example, an AES, RSA, or other suitable type of encryption key.

In step 325, the email is sent via the loan servicing system's email service, and the message may be marked as sent.

If the notification type is not fpmlEmail, in step 315, the loan servicing system's processing may continue as usual in step 330.

According to one embodiment, the creation of an outbound message with an FpML payload may be implemented as an add-on to a loan servicing system or core lending system. In another embodiment, the creation of an outbound message with an FpML payload may be implemented as an add-on to an email service.

Figure 4:
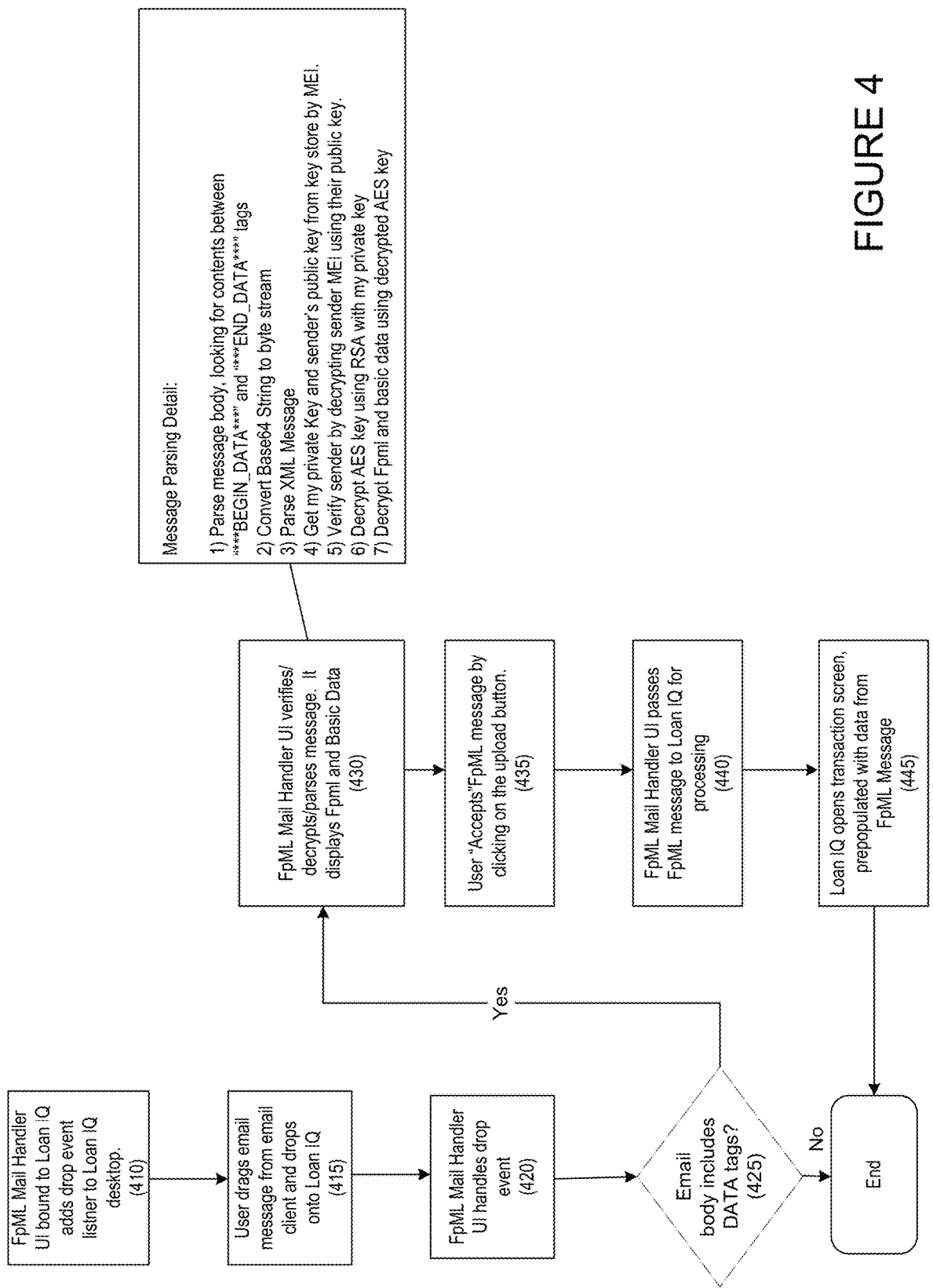
FIG. 4 is a diagram illustrating a method for processing an inbound message is according to one embodiment.

Referring to FIG. 4, an exemplary process for the processing of an inbound message is disclosed according to one embodiment.

In step 410, the FpML mail handler user interface bound to a loan servicing system, such as Loan IQ, may add a drop event listener to the loan servicing system's desktop.

In step 415, the user may drag an email message from an email client onto the user interface for the loan servicing system, and in step 420, the FpML mail handler user interface may handle the drop event.

In step 425, if the email body includes tags, such as the "**BEGIN_DATA" and "END_DATA**" tags, in step 430, the FpML mail handler user interface may verify, decrypt, and/or parse the message. It may display FpML and basic data from the message.

Exemplary message parsing details are provided in the inset in FIG. 4.

In step 435, the user may "Accept" the FpML message by clicking on a button on the user interface, such as an upload or similar button.

In step 440, the FpML mail handler user interface may pass the FpML message to the loan servicing system for processing.

In step 445, the loan servicing system may open a transaction screen that may be prepopulated with data from the FpML message.

If, in step 425, the message does not include the tags, the process may continue as usual.

According to one embodiment, the processing of an inbound message with an FpML payload may be implemented in part with an add-on to an existing email service, for example Outlook. For example, an Outlook macro may be used to scan for FpML payloads in incoming messages then insert the FpML payload into the loan servicing system. The FpML payload may be sent and received as an attachment or in the email body itself.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ operating systems, the Unix operating system, the Linux operating system, the iOS operating system, the OS X operating system, the Android operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, Python, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, the method comprising:
    receiving, by a loan servicing system via an event handler, an electronic message provided by a user and a user interface, wherein the loan servicing system comprises the event handler;
    executing, by the loan servicing system via the event handler and based on receipt of the electronic message, a software development kit (SDK) script, wherein executing the script further comprises:
        determining that the electronic message encodes FpML data and basic data in a body of the electronic message by detecting one or more tags included in the electronic message;
        encrypting the FpML data from the electronic message;
        appending the FpML data to the basic data;
    parsing, from the FpML data and between a begin tag and an end tag, a unique sender identifier, a unique receiver identifier, and a FpML message component;
        constructing an XML message including the unique sender identifier, the unique receiver identifier, the FpML message component and the basic data;
        converting the XML message to a string; and
        appending the string to the body of the electronic message between a plurality of tags; and
    sending, by the loan servicing system via an email service, the electronic message comprising the appended string to the body of the electronic message, wherein the loan servicing system comprises the email service.

2. The method of claim 1, wherein constructing the XML message comprises:
    generating a first encryption key;
    encrypting the basic data and the FpML data using the first encryption key;
    obtaining a second encryption key from a key store; and
    encrypting the first encryption key using the second encryption key.

3. The method of claim 1, wherein the unique sender identifier is a market entity identifier associated with a sender, and the unique receiver identifier is a market entity identifier associated with a receiver.

4. The method of claim 1, wherein the XML message is converted to the string using Base64 encoding.

5. A system comprising:
    at least one computer of a loan servicing system, wherein the at least one computer including a processor and a memory storing instructions that, when executed by the processor, causes the processor to perform:

receiving, via an event handler, an electronic message provided by a user and a user interface, wherein the loan servicing system comprises the event handler;
executing, via the event handler and based on receipt of the electronic message, a software development kit (SDK) script, wherein executing the script further comprises servicing system to:
   determining that the electronic message encodes FpML data and basic data in a body of the electronic message by detecting one or more tags included in the electronic message;
   appending the FpML data to the basic data;
   parsing, from the FpML data and between a begin tag and an end tag, a unique sender identifier, a unique receiver identifier, and a FpML message component;
   constructing an XML message including the unique sender identifier, the unique receiver identifier, the FpML message component and the basic data;
   converting the XML message to a string;
   appending the string to the body of the electronic message between
   a plurality of tags; and
   sending, via an email service, the electronic message comprising the appended string to the body of the electronic message, wherein the loan servicing system comprises the email service.

6. The system of claim 5, wherein constructing the XML message further comprises:
   generating a first encryption key;
   encrypting the basic data and the FpML data using the first encryption key;
   obtaining a second encryption key from a key store; and
   encrypting the first encryption key using the second encryption key.

7. The system of claim 5, wherein the unique sender identifier is a market entity identifier associated with a sender, and the unique receiver identifier is a market entity identifier associated with a receiver.

8. The system of claim 5, wherein the XML message is converted to the string using Base64 encoding.

9. A non-transitory computer readable storage medium, including instructions stored thereon, which instructions, when read and executed by one or more computer processors of a loan servicing system, cause the one or more computer processors to perform steps comprising:

receiving, via an event handler, an electronic message provided by a user and a user interface, wherein the loan servicing system comprises the event handler;
executing, via the event handler and based on receipt of the electronic message, a software development kit (SDK) script, wherein executing the script further comprises:
   determining that the electronic message encodes FpML data and basic data in a body of the electronic message by detecting one or more tags included in the electronic message;
   encrypting the FpML data from the electronic message;
   appending the FpML data to the basic data;
   parsing, from the FpML data and between a begin tag and an end tag, a unique sender identifier, a unique receiver identifier, and a FpML message component;
   constructing an XML message including the unique sender identifier, the unique receiver identifier, the FpML message component and the basic data;
   converting the XML message to a string; and
   appending the string to the body of the electronic message between a plurality of tags; and
   sending, via an email service, the electronic message comprising the appended string to the body of the electronic message, wherein the loan servicing system comprises the email service.

10. The non-transitory computer readable storage medium of claim 9, wherein constructing the XML message further comprises:
   generating a first encryption key;
   encrypting the basic data and the FpML data using the first encryption key;
   obtaining a second encryption key from a key store; and
   encrypting the first encryption key using the second encryption key.

11. The non-transitory computer readable storage medium of claim 9, wherein the unique sender identifier is a market entity identifier associated with a sender, and the unique receiver identifier is a market entity identifier associated with a receiver.

12. The non-transitory computer readable storage medium of claim 9, wherein the XML message is converted to the string using Base64 encoding.

* * * * *